United States Patent
Dai

(10) Patent No.: US 12,205,321 B2
(45) Date of Patent: *Jan. 21, 2025

(54) METHOD AND DEVICE TO DETERMINE THE CAMERA POSITION AND ANGLE

(71) Applicant: Beijing Tusen Zhitu Technology Co., Ltd., Beijing (CN)

(72) Inventor: Hengchen Dai, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,156

(22) Filed: Jul. 18, 2023

(65) Prior Publication Data

US 2023/0360260 A1  Nov. 9, 2023

Related U.S. Application Data

(63) Continuation of application No. 17/222,915, filed on Apr. 5, 2021, now Pat. No. 11,715,232, which is a
(Continued)

(30) Foreign Application Priority Data

Jan. 19, 2018  (CN) .......................... 201810051708.8

(51) Int. Cl.
*G06T 7/73* (2017.01)
*G06T 7/50* (2017.01)
*G06V 20/56* (2022.01)

(52) U.S. Cl.
CPC .................. *G06T 7/73* (2017.01); *G06T 7/50* (2017.01); *G06T 7/74* (2017.01); *G06V 20/588* (2022.01);
(Continued)

(58) Field of Classification Search
CPC .. H04L 3/0014; G01B 21/22; H04N 13/0497; H04N 13/0203; H04N 9/3182;
(Continued)

(56) References Cited

U.S. PATENT DOCUMENTS 10,970,873 B2  4/2021  Dai
2016/0290809 A1  10/2016  Eline
(Continued)

FOREIGN PATENT DOCUMENTS

CN  103328928 A  9/2013
CN  105606127 A  5/2016
(Continued)

*Primary Examiner* — Phuoc H Doan
(74) *Attorney, Agent, or Firm* — Perkins Coie LLP

(57) ABSTRACT

The present disclosure provides a method and an apparatus for determining an attitude angle of a camera fixed to a rigid object in a vehicle along with an Inertial Measurement Unit (IMU). In some embodiments, the method includes: obtaining IMU attitude angles outputted from the IMU and images captured by the camera; determining a target IMU attitude angle corresponding to each frame of image based on respective capturing time of the frames of images and respective outputting time of the IMU attitude angles; and determining an attitude angle of the camera corresponding to each frame of image based on a predetermined conversion relationship between a camera coordinate system for the camera and an IMU coordinate system for the IMU and the target IMU attitude angle corresponding to each frame of image.

20 Claims, 7 Drawing Sheets

Related U.S. Application Data continuation of application No. 16/248,650, filed on Jan. 15, 2019, now Pat. No. 10,970,873.

(52) U.S. Cl.
CPC .............. *G06T 2207/30244* (2013.01); *G06T 2207/30256* (2013.01)

(58) Field of Classification Search
CPC ........... G06T 2207/30256; G06T 11/60; G06T 7/0012; G06T 7/74; G06T 7/50; G06Q 50/02; A01B 79/005; G06K 9/00798
See application file for complete search history.

(56) References Cited

U.S. PATENT DOCUMENTS

| | | | |
|---|---|---|---|
| 2018/0338126 A1* | 11/2018 | Trevor | ................. H04N 23/698 |
| 2019/0259176 A1 | 8/2019 | Dai | |
| 2021/0225030 A1 | 7/2021 | Dai | |

FOREIGN PATENT DOCUMENTS

| | | | |
|---|---|---|---|
| CN | 106840140 A | 6/2017 | |
| CN | 107093210 A | 8/2017 | |
| CN | 107172320 A | 9/2017 | |
| CN | 107341831 A | 11/2017 | |
| KR | 101286741 B1 | 7/2013 | |
| WO | 2018002004 A1 | 1/2018 | |

* cited by examiner

METHOD AND DEVICE TO DETERMINE THE CAMERA POSITION AND ANGLE

CROSS-REFERENCE TO RELATED APPLICATIONS

This patent document is a continuation of U.S. patent application Ser. No. 17/222,915, filed on Apr. 5, 2021, which is a continuation of U.S. patent application Ser. No. 16/248,650, filed Jan. 15, 2019, which claims priority to and the benefit of Chinese Patent Application No. 201810051708.8, filed on Jan. 19, 2018. The aforementioned applications of which are incorporated herein by reference in their entireties.

TECHNICAL FIELD

The present disclosure relates to automated driving technology, and more particularly, to a method and an apparatus for determining an attitude angle of a camera, a method and an apparatus for measuring a distance to an object, and a method and an apparatus for vehicle positioning.

BACKGROUND

In visual positioning, a system needs to determine a position of a camera based on its real-time pose. As the camera may shake or rotate, conventional methods for determining a pose of a camera mainly determine the pose of the camera based on feature points or preset references. However, these methods typically have large errors.

Particularly, for a vehicle-mounted camera, the camera may severely shake or rotate when a vehicle sways, bumps, suddenly brakes or sharply turns while moving. Thus, how to obtain a pose of a camera accurately becomes a problem to be solved.

SUMMARY

In view of the above problem, the present disclosure provides a method and an apparatus for determining an attitude angle of a camera, capable of improving the accuracy of the attitude angle of the camera, such that a pose of the camera may be obtained more accurately based on the attitude angle of the camera. The present disclosure further provides a method and an apparatus for measuring a distance to an object, capable of measuring the distance to the object based on an attitude angle of a camera as determined in accordance with the above method for determining the attitude angle of the camera, such that the accuracy of the distance measurement may be improved. Finally, the present disclosure further provides a method and an apparatus for vehicle positioning, capable of determining a position of a vehicle based on an attitude angle of a camera as determined in accordance with the above method for determining the attitude angle of the camera, such that the accuracy of the vehicle positioning may be improved.

In a first aspect, according to some embodiments of the present disclosure, a method for determining an attitude angle of a camera is provided. The camera is fixed to one and the same rigid object in a vehicle along with an Inertial Measurement Unit (IMU). The method includes: obtaining IMU attitude angles outputted from the IMU and images captured by the camera; determining a target IMU attitude angle corresponding to each frame of image based on respective capturing time of the frames of images and respective outputting time of the IMU attitude angles; and determining an attitude angle of the camera corresponding to each frame of image based on a predetermined conversion relationship between a camera coordinate system for the camera and an IMU coordinate system for the IMU and the target IMU attitude angle corresponding to each frame of image.

In a second aspect, according to some embodiments of the present disclosure, an apparatus for determining an attitude angle of a camera is provided. The apparatus includes: an obtaining unit configured to obtain Inertial Measurement Unit (IMU) attitude angles outputted from an IMU and images captured by a camera; the camera and the IMU being fixed to one and the same rigid object in a vehicle; a calculating unit configured to determine a target IMU attitude angle corresponding to each frame of image based on respective capturing time of the frames of images and respective outputting time of the IMU attitude angles; and a determining unit configured to determine an attitude angle of the camera corresponding to each frame of image based on a predetermined conversion relationship between a camera coordinate system for the camera and an IMU coordinate system for the IMU and the target IMU attitude angle corresponding to each frame of image.

With the method and apparatus for determining an attitude angle of a camera according to the embodiments of the present disclosure, the camera is fixed to one and the same rigid object in a vehicle along with an Inertial Measurement Unit (IMU), such that the camera and the IMU may move in accordance with one and the same rigid movement model. When the vehicle is bumping, swaying, suddenly braking or sharply turning, the spatial position relationship between the camera and the IMU may be maintained unchanged. The accuracy of the IMU attitude angle outputted from the IMU will not be affected when the vehicle is bumping, swaying, suddenly braking or sharply turning. Thus, by using the IMU attitude angle outputted from the IMU as a reference for determining the attitude angle of the camera, the accuracy of the attitude angle of the camera may be improved, such that a pose of the camera obtained based on the attitude angle of the camera may be more accurate.

In a third aspect, according to some embodiments of the present disclosure, a method for measuring a distance to an object is provided. The method includes, for each frame of image captured by a camera: obtaining an attitude angle of the camera corresponding to the current frame of image by using the above method for determining the attitude angle of the camera; adjusting at least one external parameter between a camera coordinate system for the camera and a world coordinate system based on the attitude angle of the camera; determining respective image coordinates of position points on a lane line on a map in the current frame of image and respective distance information associated with the position points based on a predetermined conversion relationship between an image coordinate system and the world coordinate system and the at least one external parameter between the camera coordinate system and the world coordinate system; and determining the position point on the lane line on the map in the current frame of image that is closest to a target object, and determining a distance to the target object based on the distance information associated with the position point.

In a fourth aspect, according to some embodiments of the present disclosure, an apparatus for measuring a distance to an object is provided. The apparatus is connected to the above apparatus for determining a pose of a camera. The apparatus includes: a first pose obtaining unit configured to obtain, from the apparatus for determining an attitude angle of the camera, the attitude angle of the camera corresponding to a current frame of image captured by the camera; a first adjusting unit configured to adjust at least one external parameter between a camera coordinate system and a world coordinate system based on the attitude angle of the camera; a mapping unit configured to determine respective image coordinates of position points on a lane line on a map in the current frame of image and respective distance information associated with the position points based on a predetermined conversion relationship between an image coordinate system and the world coordinate system and the at least one external parameter between the camera coordinate system and the world coordinate system; and a distance determining unit configured to determine the position point on the lane line on the map in the current frame of image that is closest to a target object, and determine a distance to the target object based on the distance information associated with the position point.

The method and apparatus for measuring a distance to an object according to the embodiments of the present disclosure use an attitude angle of a camera determined by using the above method for determining the attitude angle of the camera. As the attitude angle of the camera provided by the above method is more accurate, by using the attitude angle of the camera for measuring the distance to the target object, the obtained distance measurement result may be more accurate.

In a fifth aspect, according to some embodiments of the present disclosure, a method for vehicle positioning is provided. The method for vehicle positioning includes: obtaining an attitude angle of a camera corresponding to each frame of image captured by the camera by using the above method for determining the attitude angle of the camera; adjusting at least one external parameter between a camera coordinate system and a vehicle coordinate system based on the attitude angle of the camera; and obtaining an attitude angle of the vehicle in a world coordinate system based on a conversion relationship between the camera coordinate system and the vehicle coordinate system and a predetermined conversion relationship between the vehicle coordinate system and the world coordinate system, and the attitude angle of the camera.

In a sixth aspect, according to some embodiments of the present disclosure, an apparatus for vehicle positioning is provided. The apparatus is connected to the above apparatus for determining an attitude angle of a camera. The apparatus includes: a second pose obtaining unit configured to obtain, from the apparatus for determining the attitude angle of the camera, the attitude angle of the camera corresponding to each frame of image captured by the camera; a second adjusting unit configured to adjust at least one external parameter between a camera coordinate system and a vehicle coordinate system based on the attitude angle of the camera; and a positioning unit configured to obtain an attitude angle of the vehicle in a world coordinate system based on a conversion relationship between the camera coordinate system and the vehicle coordinate system and a predetermined conversion relationship between the vehicle coordinate system and the world coordinate system, and the attitude angle of the camera.

The method and apparatus for vehicle positioning according to the embodiments of the present disclosure use an attitude angle of a camera determined by using the above method for determining the attitude angle of the camera. As the attitude angle of the camera provided by the above method is more accurate, by using the attitude angle of the camera for vehicle positioning, the obtained positioning result may be more accurate.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In the embodiments of the present disclosure, the conversion relationship between the camera coordinate system and the vehicle coordinate system, the conversion relationship between the camera coordinate system and the world coordinate system, the conversion relationship between the image coordinate system and the imaging plane coordinate system of the camera and the conversion relationship between the imaging plane coordinate system of the camera and the camera coordinate system are all prior arts. The conversions between the coordinate systems are not an inventive concept of the present disclosure.

The method and apparatus for determining an attitude angle of a camera according to the embodiments of the present disclosure may be applied to a vehicle side or an aerial vehicle (e.g., unmanned aerial vehicle), an unmanned ship, a robot or the like. The present disclosure is not limited to any specific application scenarios.

Embodiment 1

Figure 1:
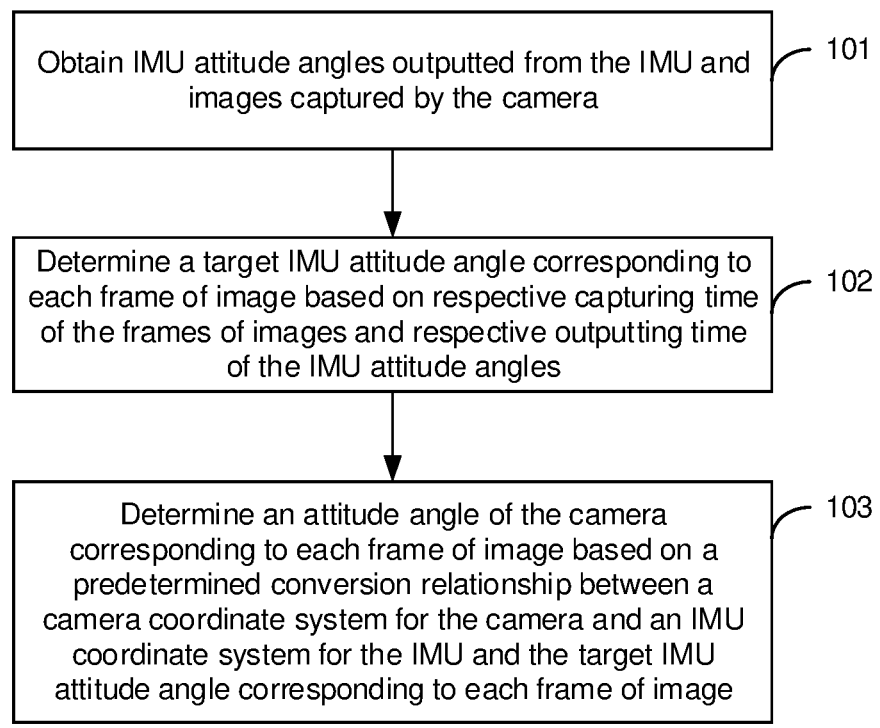
FIG. 1 is a flowchart illustrating a method for determining an attitude angle of a camera according to some embodiments of the present disclosure.

Referring to FIG. 1, which is a flowchart illustrating a method for determining an attitude angle of a camera according to an embodiment of the present disclosure, in this method, the camera is fixed to one and the same rigid object in a vehicle (e.g., a frame of the vehicle) along with an Inertial Measurement Unit (IMU). The method includes the following steps.

At step 101, IMU attitude angles outputted from the IMU and images captured by the camera are obtained.

In the step 101, the obtaining of the IMU attitude angles outputted from the IMU and the images captured by the camera may be started at one and the same time point. For example, starting from a particular time point, n IMU attitude angles outputted from the IMU and m images captured by the camera may be obtained within a time period T. The images (or IMU attitude angles) may be obtained from the camera (or IMU) by transmitting a data obtaining request to the camera (or IMU). Alternatively, the camera (or IMU) may actively transmit the images (or IMU attitude angles) in accordance with a capturing period (or outputting period). The present disclosure is not limited to any specific scheme for obtaining the images and IMU attitude angles.

At step 102, a target IMU attitude angle corresponding to each frame of image is determined based on respective capturing time of the frames of images and respective outputting time of the IMU attitude angles.

At step 103, an attitude angle of the camera corresponding to each frame of image is determined based on a predetermined conversion relationship between a camera coordinate system for the camera and an IMU coordinate system for the IMU and the target IMU attitude angle corresponding to each frame of image.

In an embodiment of the present disclosure, when the camera and the IMU are fixed to one and the same rigid object, there will be a fixed spatial position relationship between the camera and the IMU. As the camera and the IMU are fixed to one and the same rigid object, they may move in accordance with one and the same rigid movement model. Thus, when the vehicle is bumping, swaying, suddenly braking or sharply turning, the spatial position relationship between the camera and the IMU may be maintained unchanged.

In an embodiment of the present disclosure, assuming that the camera coordinate system for the camera is represented as $X_c Y_c Z_c$ and the IMU coordinate system for the IMU is represented as $X_i Y_i Z_i$, each of the IMU attitude angles outputted from the IMU and the target IMU attitude angle contains deflection angles on X-axis, Y-axis and Z-axis in $X_i Y_i Z_i$, denoted as $W_{ix}$, $W_{iy}$ and $W_{iz}$, respectively. In an implementation of the step 103, $W_{ix}$, $W_{iy}$ and W may be converted into deflection angles on X-axis, Y-axis and Z-axis in $X_c Y_c Z_c$, denoted as $W_{cx}$, $W_{cy}$ and $W_{cz}$, respectively, based on the predetermined conversion relationship between the camera coordinate system for the camera and the IMU coordinate system for the IMU. Here, $W_{cc}$, $W_{cy}$ and $W_{cz}$ are the attitude angle of the camera.

Preferably, in an embodiment of the present disclosure, in a non-limiting implementation of the above step 102, the following steps A-B may be performed for each frame of image.

At step A, at least one IMU attitude angle whose outputting time matches the capturing time of the current frame of image is selected from the IMU attitude angles.

At step B, the target IMU attitude angle corresponding to the current frame of image is determined based on the selected at least one IMU attitude angle.

Figure 2:
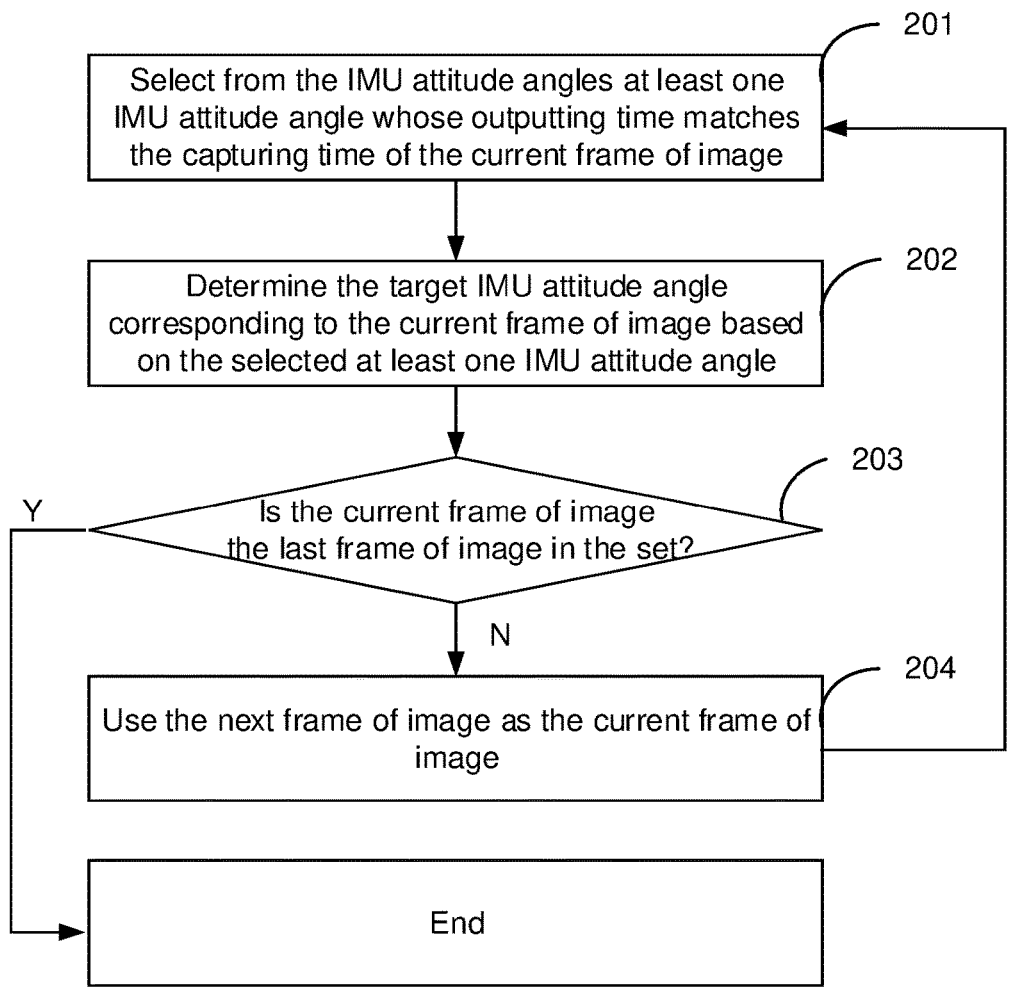
FIG. 2 is a detailed flowchart illustrating determining of an attitude angle of a camera according to some embodiments of the present disclosure.

In particular, as shown in FIG. 2, for a set of a plurality of frames of images, the following process may be applied to each of the images in the set, so as to obtain the target IMU attitude angle corresponding to each frame of image.

At step 201, at least one IMU attitude angle whose outputting time matches the capturing time of the current frame of image is selected from the IMU attitude angles.

At step 202, the target IMU attitude angle corresponding to the current frame of image is determined based on the selected at least one IMU attitude angle.

At step 203, it is determined whether the current frame of image is the last frame of image in the set. If so, the process ends; otherwise the process proceeds with step 204.

At step 204, the next frame of image is used as the current frame of image and the step 201 is performed for the current frame of image.

Preferably, in an embodiment of the present disclosure, the step A may be, but not limited to be, implemented in any of the following schemes (Schemes A1~A3).

Scheme A1: The IMU attitude angles are sorted in an order according to their respective outputting time, to obtain a sequence of IMU attitude angles. A predetermined sliding window is moved over the sequence of IMU attitude angles such that the sliding window is centered at the capturing time of the current frame of image, and at least one IMU attitude angle within the sliding window is determined as the at least one IMU attitude angle whose outputting time matches the capturing time of the current frame of image.

Figure 3A:
FIG. 3A is a schematic diagram showing a sequence of IMU attitude angles according to some embodiments of the present disclosure.
Figure 3B:
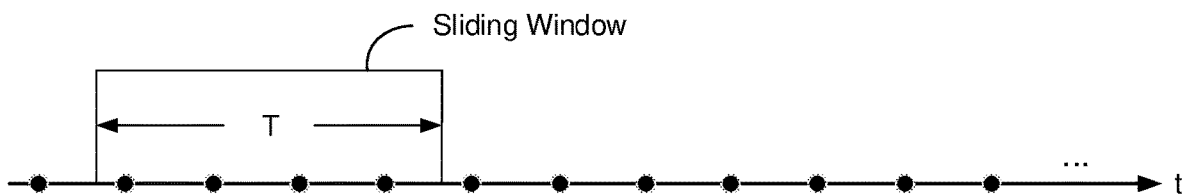
FIG. 3B is a schematic diagram showing movement of a sliding window over a sequence of IMU attitude angles according to some embodiments of the present disclosure.
Figure 3C:
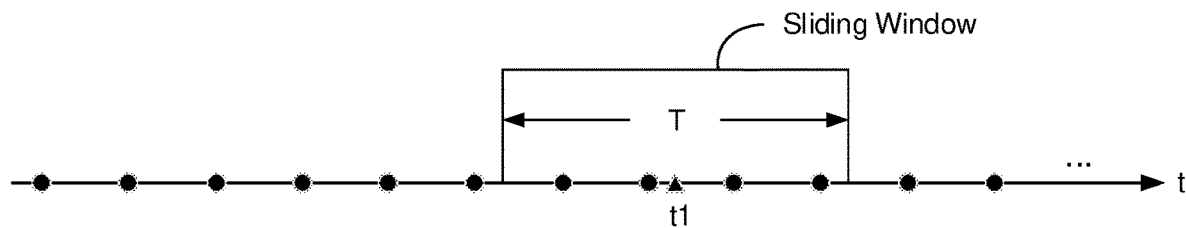
FIG. 3C is a schematic diagram showing a sliding window being moved to a position where it is centered at capturing time of a current frame of image according to some embodiments of the present disclosure.

It is assumed that the sliding window has a length of T seconds and the capturing time of the current frame of image is $t_1$. FIG. 3A is a schematic diagram showing the sequence of sorted IMU attitude angles. FIG. 3B is a schematic diagram showing movement of the sliding window over the sequence of IMU attitude angles. FIG. 3C is a schematic diagram showing the sliding window being moved to the position where it is centered at the capturing time $t_1$ of the current frame of image. The time range of the sliding window shown in FIG. 3C is $[t_1-T/2, t_1+T/2]$. The IMU attitude angles whose respective outputting time falls into the time range may be determined as the IMU attitude angles whose respective outputting time matches the capturing time of the current frame of image.

Figure 3D:
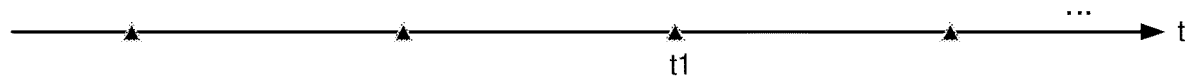
FIG. 3D is a schematic diagram showing a sequence of images according to some embodiments of the present disclosure.
Figure 3E:
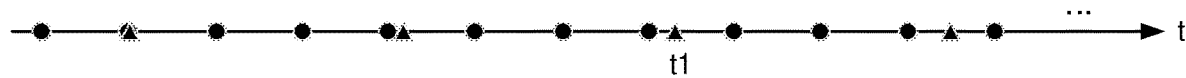
FIG. 3E is a schematic diagram showing a mixed sequence according to some embodiments of the present disclosure.
Figure 3F:
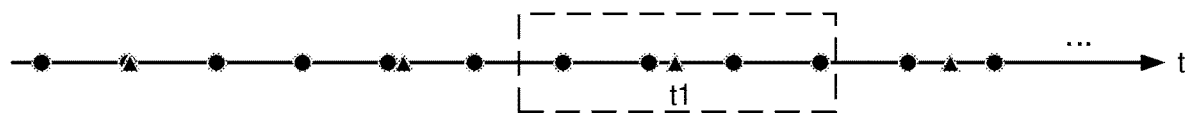
FIG. 3F is a schematic diagram showing IMU attitude angles whose outputting time matches capturing time of a current frame of image according to some embodiments of the present disclosure.

Scheme A2: The IMU attitude angles are sorted in an order according to their respective outputting time, to obtain a sequence of IMU attitude angles. The frames of images are sorted in an order according to their respective capturing time, to obtain a sequence of images, as shown in FIG. 3D. The sequence of IMU attitude angles and the sequence of images are combined into a mixed sequence, as shown in FIG. 3E (in which each circle denotes an IMU attitude angle and each triangle denotes an image). A number of IMU attitude angles close to the current frame of image on both sides of the current frame of image in the mixed sequence are determined as the IMU attitude angles whose respective outputting time matches the capturing time of the current frame of image, as shown in FIG. 3F (in which the IMU attitude angles within the dashed box are the IMU attitude angles whose respective outputting time matches the capturing time of the current frame of image).

Scheme A3: An absolute difference between the outputting time of each of the IMU attitude angles and the capturing time of the current frame of image is calculated. At least one IMU attitude angle each having a small absolute difference may be determined as the at least one IMU attitude angle whose outputting time matches the capturing time of the current frame of image.

Preferably, in an embodiment of the present disclosure, the above step B may be, but not limited to be, implemented in any of the following schemes (Schemes B1~B3).

Scheme B1: A movement curve of the camera or the rigid object is obtained (in an embodiment of the present disclosure, as the camera and the IMU are fixed to the rigid object, it may be considered that the camera, the rigid object and the IMU have the same movement curve). An IMU attitude angle curve is obtained by fitting the movement curve based on the selected at least one IMU attitude angle. An IMU attitude angle corresponding to the capturing time of the current frame of image is obtained from the IMU attitude angle curve, as the target IMU attitude angle corresponding to the current frame of image.

Figure 4A:
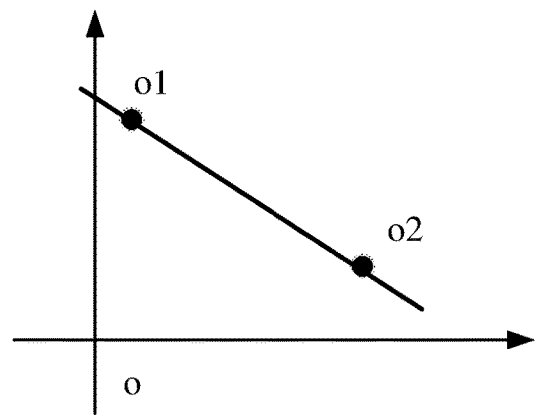
FIG. 4A is a schematic diagram showing a movement curve of a camera/rigid object, which is a straight line, according to some embodiments of the present disclosure.
Figure 4B:
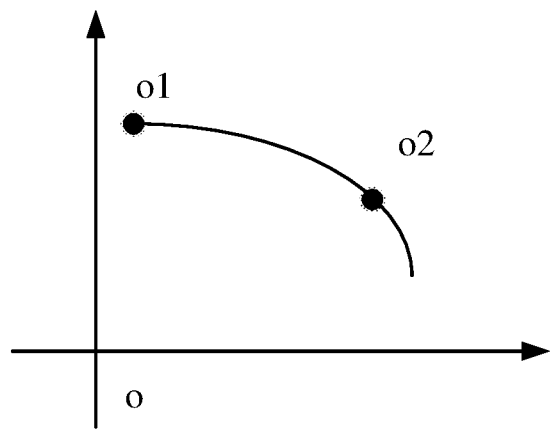
FIG. 4B is a schematic diagram showing a movement curve of a camera/rigid object, which is a parabola having a downwards opening, according to some embodiments of the present disclosure.

In Scheme B1, the movement curve of the camera, rigid object or IMU may be predetermined or may be calculated based on a movement trajectory of the camera, rigid object or IMU in accordance with an algorithm. The movement curve of the camera may be a straight line, as shown in FIG. 4A, when the camera moves from a center point $O_1$ to a center point $O_2$ along a straight line, or may be a parabola having a downwards opening, as shown in FIG. 4B, when the camera moves from a center point $O_1$ to a center point $O_2$ along a curve.

Scheme B2: An average (e.g., arithmetical average or geometric average, as non-limiting examples) of the selected at least one IMU attitude angle is calculated, as the target IMU attitude angle corresponding to the current frame of image.

Scheme B3: An absolute difference between the outputting time of each of the selected at least one IMU attitude angle and the capturing time of the current frame of image is calculated. The IMU attitude angle having the smallest absolute difference is determined as the target IMU attitude angle corresponding to the current frame of image.

Embodiment 2

Figure 5:
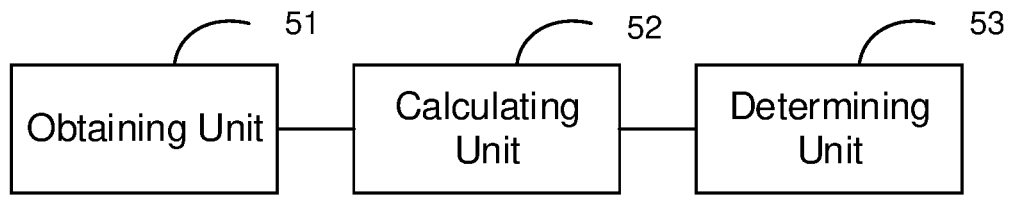
FIG. 5 is a schematic diagram showing a structure of an apparatus for determining an attitude angle of a camera according to some embodiments of the present disclosure.

Based on the same concept as the method for determining an attitude angle of a camera according to the above Embodiment 1, according to Embodiment 2, an apparatus for determining an attitude angle of a camera is provided. The apparatus has a structure shown in FIG. 5 and includes the following units.

An obtaining unit 51 is configured to obtain IMU attitude angles outputted from an IMU and images captured by a camera. The camera and the IMU are fixed to one and the same rigid object in a vehicle.

A calculating unit 52 is configured to determine a target IMU attitude angle corresponding to each frame of image based on respective capturing time of the frames of images and respective outputting time of the IMU attitude angles.

A determining unit 53 is configured to determine an attitude angle of the camera corresponding to each frame of image based on a predetermined conversion relationship between a camera coordinate system for the camera and an IMU coordinate system for the IMU and the target IMU attitude angle corresponding to each frame of image.

Preferably, the calculating unit 52 is configured to perform the following steps for each frame of image.

At step A, at least one IMU attitude angle whose outputting time matches the capturing time of the current frame of image is selected from the IMU attitude angles.

At step B, the target IMU attitude angle corresponding to the current frame of image is determined based on the selected at least one IMU attitude angle.

The step A may be, but not limited to be, implemented in any of Schemes A1-A3 as described above in connection with Embodiment 1 and details thereof will be omitted here.

The step B may be, but not limited to be, implemented in any of Schemes B 1-B3 as described above in connection with Embodiment 1 and details thereof will be omitted here.

In Embodiment 2 of the present disclosure, assuming that the camera coordinate system for the camera is represented as $X_c Y_c Z_c$ and the IMU coordinate system for the IMU is represented as $X_i Y_i Z_i$, each of the IMU attitude angles outputted from the IMU and the target IMU attitude angle contains deflection angles on X-axis, Y-axis and Z-axis in $X_i Y_i Z_i$, denoted as $W_{ix}$, $W_{iy}$ and $W_{iz}$, respectively. In a specific implementation, the determining unit 53 may be configured to convert $W_{ix}$, $W_{iy}$ and $W_{iz}$ into deflection angles on X-axis, Y-axis and Z-axis in $X_c Y_c Z_c$, denoted as $W_{cx}$, $W_{cy}$ and $W_{cz}$, respectively, based on the predetermined conversion relationship between the camera coordinate system for the camera and the IMU coordinate system for the IMU. Here, $W_{cx}$, $W_{vy}$ and $W_{cz}$ are the attitude angle of the camera.

With the method for determining an attitude angle of a camera according to the above Embodiment 1 and the apparatus for determining an attitude angle of a camera according to Embodiment 2, the accuracy of the attitude angle of the camera may be improved. Accordingly, a pose of the camera determined based on the attitude angle of the camera may be improved. Moreover, results of other processes, e.g., object distance measurement and vehicle positioning, based on the attitude angle of the camera, may be more accurate. In the following, some embodiments will be described in detail, in which the attitude angle of the camera is used in application scenarios such as object distance measurement and vehicle positioning.

Embodiment 3

Figure 6:
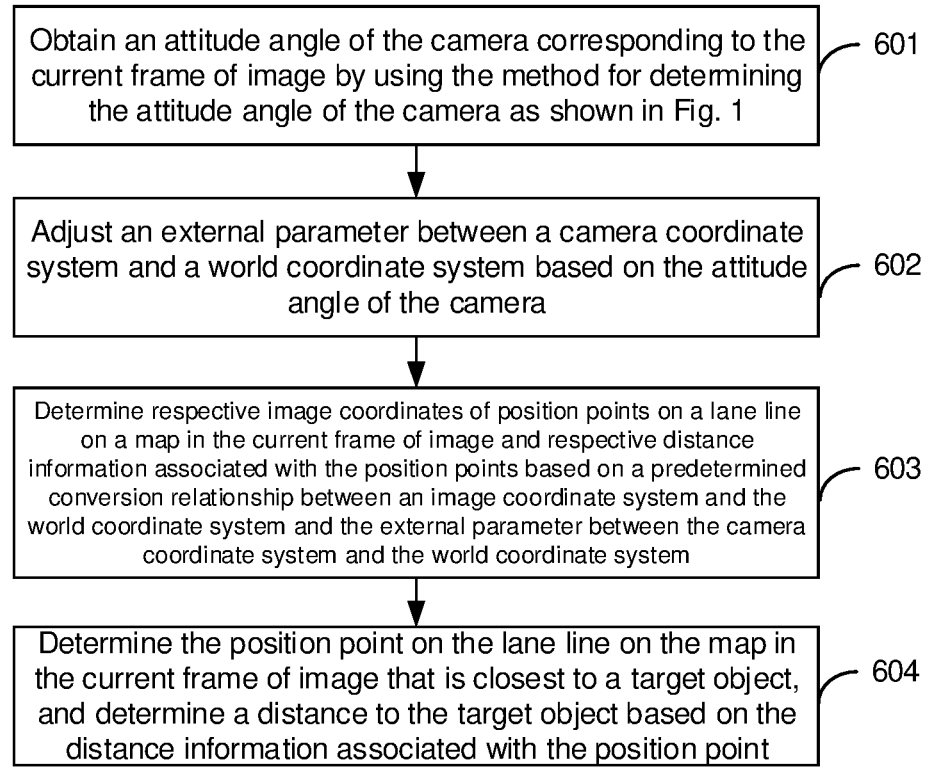
FIG. 6 is a flowchart illustrating a method for measuring a distance to an object according to some embodiments of the present disclosure.

According to Embodiment 3 of the present disclosure, a method for measuring a distance to an object is provided. The method includes the following steps for each frame of image captured by a camera, as shown in the flowchart of FIG. 6.

At step 601, an attitude angle of the camera corresponding to the current frame of image by using the method for determining the attitude angle of the camera as shown in FIG. 1.

At step 602, at least one external parameter between a camera coordinate system for the camera and a world coordinate system is adjusted based on the attitude angle of the camera.

At step 603, respective image coordinates of position points on a lane line on a map in the current frame of image and respective distance information associated with the position points (the respective distance information indicating distances from the position points to the camera) are determined based on a predetermined conversion relationship between an image coordinate system and the world coordinate system and the at least one external parameter between the camera coordinate system and the world coordinate system.

At step 604, the position point on the lane line on the map in the current frame of image that is closest to a target object is determined, and a distance to the target object is determined based on the distance information associated with the position point.

For details of the above step 601, reference can be made to Embodiment 1 and description thereof will be omitted here.

In an embodiment of the present disclosure, the at least one external parameter between the camera coordinate system for the camera and the world coordinate system may include R and t, where R is a matrix representation of the attitude angle of the camera, and t is a translation value for X-axis, Y-axis and Z-axis between the camera coordinate system and the world coordinate system and is constant. Before the vehicle moves, R has an initial value of 0. While the vehicle is moving, the value of R will vary as the attitude angle of the camera varies. Hence, R may be obtained by converting the attitude angle of the camera corresponding to each frame of image. In a specific implementation of the above step 602, R of the external parameter between the camera coordinate system for the camera and the world coordinate system is adjusted based on the attitude angle of the camera.

Figure 7A:
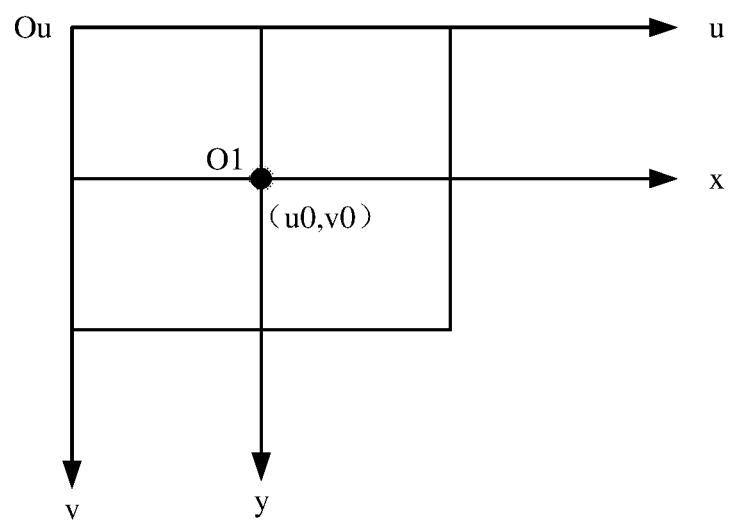
FIG. 7A is a schematic diagram showing a relationship between an image coordinate system and an imaging plane coordinate system according to some embodiments of the present disclosure.

In an embodiment of the present disclosure, a relationship between the image coordinate system of the camera, denoted as uv, and the imaging plane coordinate system of the camera, denoted as xy, is shown in FIG. 7A. The conversion relationship between the imaging plane coordinate system and the camera coordinate system is represented as Equation (1):

$$\begin{bmatrix} u \\ v \\ 1 \end{bmatrix} = \underbrace{\begin{bmatrix} f_u & -f_u \cot\theta & u_0 \\ 0 & f_v/\sin\theta & v_0 \\ 0 & 0 & 1 \end{bmatrix}}_{K} \begin{bmatrix} x \\ y \\ 1 \end{bmatrix} \quad (1)$$

where K is an internal parameter of the camera, which is determined at manufacture.

Figure 7B:
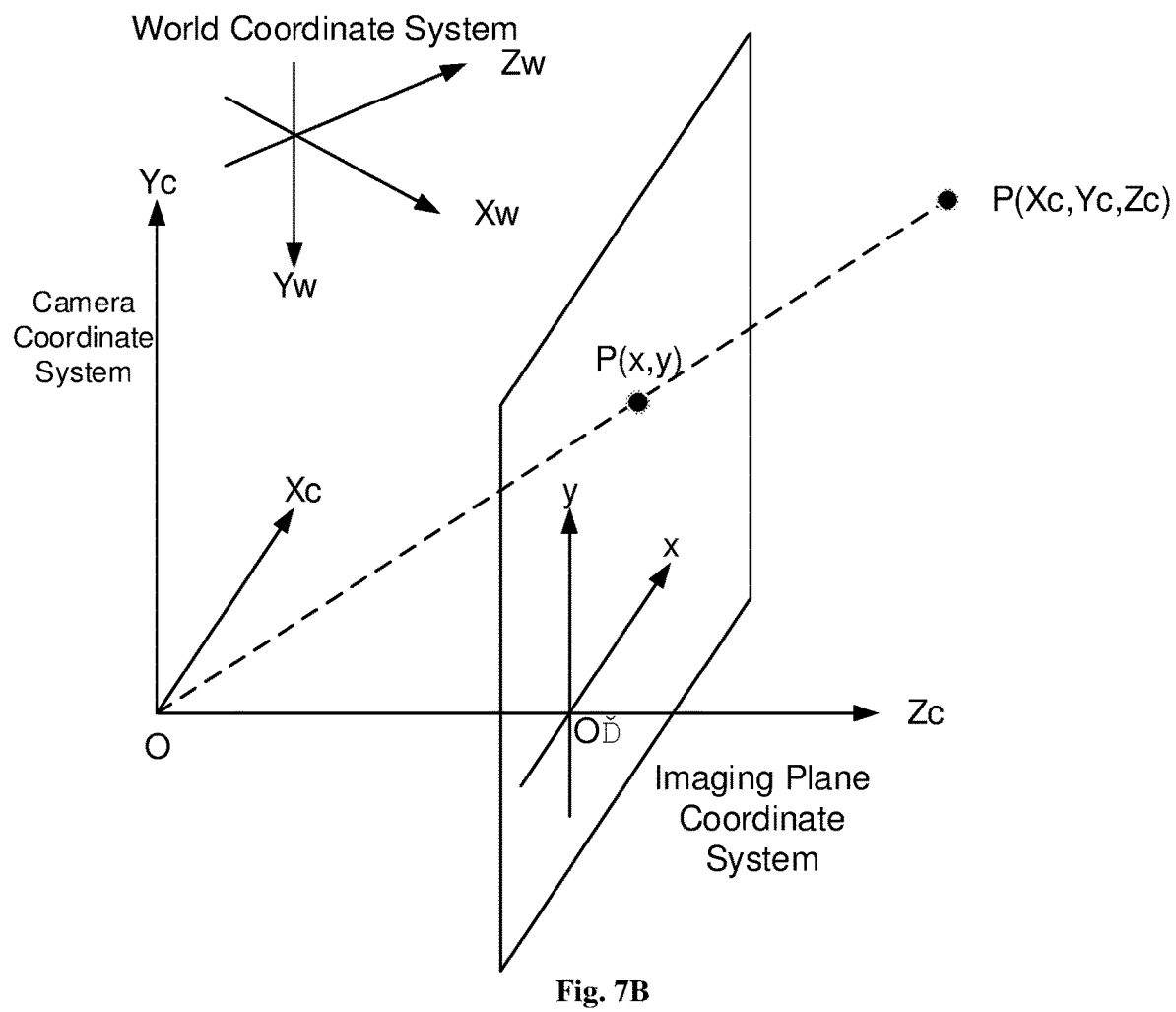
FIG. 7B is a schematic diagram showing a relationship among an imaging plane coordinate system, a camera coordinate system and a world coordinate system.

In an embodiment of the present disclosure, the relationship among the imaging plane coordinate system of the camera (xy), the camera coordinate system ($X_c Y_c Z_c$) and the world coordinate system ($X_w Y_w Z_w$) is shown in FIG. 7B. The origin O of the camera coordinate system and the origin O' of the imaging plane coordinate system are on one and the same axis and OO' is the focal length of the camera. The conversion relationship between the imaging plane coordinate system and the camera coordinate system is represented as Equation (2). The conversion relationship between the camera coordinate system and the world coordinate system is represented as Equation (3). From Equations (1), (2) and (3), the conversion relationship between the image coordinate system and the world coordinate system may be obtained as Equation (4).

$$Z_c \begin{bmatrix} x \\ y \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} X_c \\ Y_c \\ Z_c \\ 1 \end{bmatrix} \quad (2)$$

$$\begin{bmatrix} X_c \\ Y_c \\ Z_c \\ 1 \end{bmatrix} = \begin{bmatrix} R & t \\ 0^T & 1 \end{bmatrix} \begin{bmatrix} X_w \\ Y_w \\ Z_w \\ 1 \end{bmatrix} \quad (3)$$

$$Z_c \begin{bmatrix} u \\ v \\ 1 \end{bmatrix} = \underbrace{\begin{bmatrix} f_u & -f_u \cot\theta & u_0 \\ 0 & f_v/\sin\theta & v_0 \\ 0 & 0 & 1 \end{bmatrix}}_{K} \begin{bmatrix} f & 0 & 0 & 0 \\ 0 & f & 0 & 0 \\ 0 & 0 & 1 & 0 \end{bmatrix} \begin{bmatrix} R & t \\ 0^T & 1 \end{bmatrix} \begin{bmatrix} X_w \\ Y_w \\ Z_w \\ 1 \end{bmatrix} \quad (4)$$

In Equations (3) and (4), R and t are the external parameters between the camera coordinate system and the earth coordinate system, where R is a matrix representation of the attitude angle of the camera, and t is a translation value between the camera coordinate system and the world coordinate system.

Embodiment 4

Figure 8:
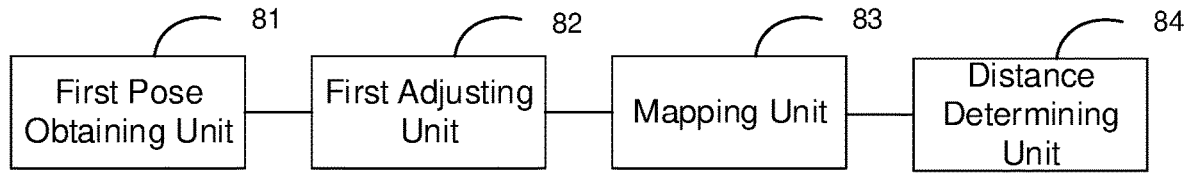
FIG. 8 is a schematic diagram showing a structure of an apparatus for measuring a distance to an object according to some embodiments of the present disclosure.

Based on the same concept as the method for measuring a distance to an object according to the above Embodiment 3, according to Embodiment 4, an apparatus for measuring a distance to an object is provided. The apparatus is connected to the apparatus for determining an attitude angle of a camera according to the above Embodiment 2. The apparatus has a structure shown in FIG. 8 and includes the following units.

A first pose obtaining unit 81 is configured to obtain, from the apparatus for determining the attitude angle of the camera, the attitude angle of the camera corresponding to a current frame of image captured by the camera.

A first adjusting unit 82 is configured to adjust at least one external parameter between a camera coordinate system for the camera and a world coordinate system based on the attitude angle of the camera.

A mapping unit 83 is configured to determine respective image coordinates of position points on a lane line on a map in the current frame of image and respective distance information associated with the position points based on a predetermined conversion relationship between an image coordinate system and the world coordinate system and the at least one external parameter between the camera coordinate system and the world coordinate system.

A distance determining unit 84 is configured to determine the position point on the lane line on the map in the current frame of image that is closest to a target object, and determine a distance to the target object based on the distance information associated with the position point.

For details of the first adjusting unit 82, reference can be made to the step 602 and description thereof will be omitted here.

For details of the mapping unit 83, reference can be made to the above Equation (4) and description thereof will be omitted here.

Embodiment 5

Figure 9:
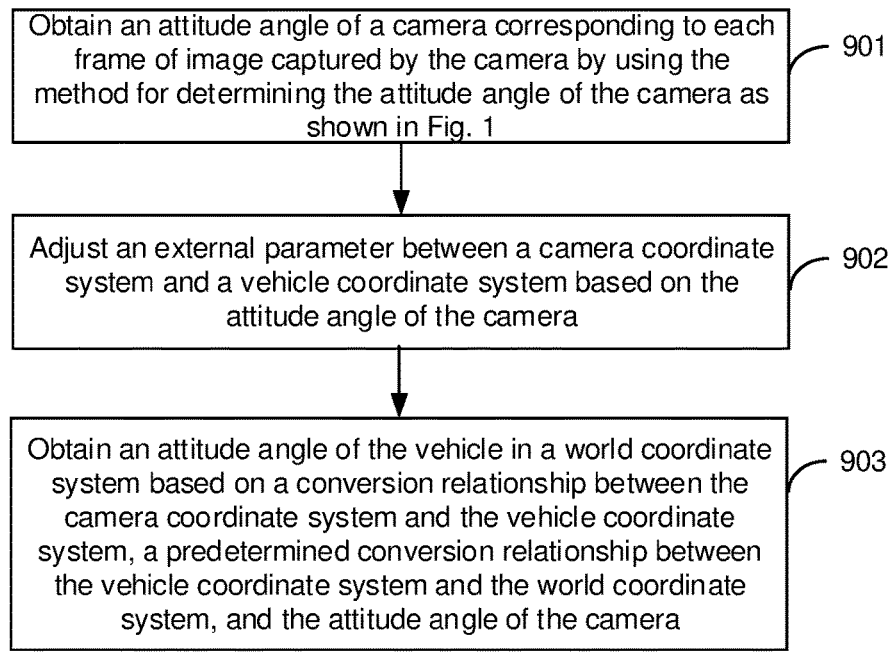
FIG. 9 is a flowchart illustrating a method for vehicle positioning according to some embodiments of the present disclosure.

According to Embodiment 5 of the present disclosure, a method for vehicle positioning is provided. The method includes the following steps, as shown in the flowchart of FIG. 9.

At step 901, an attitude angle of a camera corresponding to each frame of image captured by the camera is obtained by using the method for determining the attitude angle of the camera as shown in FIG. 1.

At step 902, at least one external parameter between a camera coordinate system and a vehicle coordinate system is adjusted based on the attitude angle of the camera.

At step 903, an attitude angle of the vehicle in a world coordinate system is obtained based on a conversion relationship between the camera coordinate system and the vehicle coordinate system, a predetermined conversion relationship between the vehicle coordinate system and the world coordinate system, and the attitude angle of the camera.

In an embodiment of the present disclosure, the attitude angle of the vehicle in the world coordinate system and position information obtained by a positioning sensor (e.g., Global Positioning System (GPS) or Global Navigation Satellite System (GNSS)) in the vehicle are used as positioning information of the vehicle.

In an embodiment of the present disclosure, the at least one external parameter between the camera coordinate system and the vehicle coordinate system may include R and t, where R is a matrix representation of the attitude angle of the camera, and t is a translation value between the camera coordinate system and the vehicle coordinate system. Here, t is constant while the vehicle is moving and R varies as the attitude angle of the camera varies. That is, R may be obtained by converting the attitude angle of the camera corresponding to the current frame of image.

In an embodiment of the present disclosure, the vehicle coordinate system is represented as $X_v Y_v Z_v$. The conversion relationship between the camera coordinate system and the vehicle coordinate system is represented as Equation (5). The conversion relationship between the camera coordinate system and the world coordinate system is represented as Equation (3).

$$\begin{bmatrix} X_c \\ Y_c \\ Z_c \\ 1 \end{bmatrix} = \begin{bmatrix} R & t \\ 0^T & 1 \end{bmatrix} \begin{bmatrix} X_v \\ Y_v \\ Z_v \\ 1 \end{bmatrix} \quad (5)$$

Embodiment 6

Figure 10:
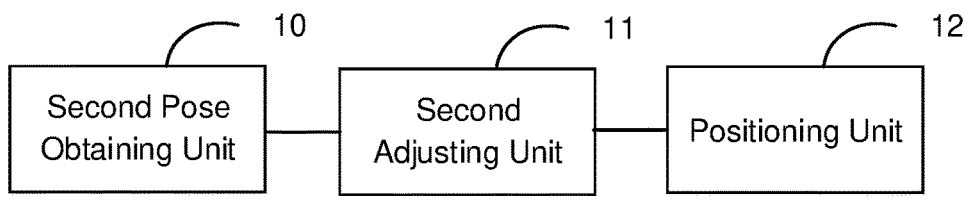
FIG. 10 is a schematic diagram showing a structure of an apparatus for vehicle positioning according to some embodiments of the present disclosure.

Based on the same concept as the method for vehicle positioning according to the above Embodiment 5, according to Embodiment 6, an apparatus for vehicle positioning is provided. The apparatus is connected to the apparatus for determining an attitude angle of a camera according to the above Embodiment 2. The apparatus has a structure shown in FIG. 10 and includes the following units.

A second pose obtaining unit 10 is configured to obtain, from the apparatus for determining the attitude angle of the camera, the attitude angle of the camera corresponding to each frame of image captured by the camera.

A second adjusting unit 11 is configured to adjust at least one external parameter between a camera coordinate system and a vehicle coordinate system based on the attitude angle of the camera.

A positioning unit 12 is configured to obtain an attitude angle of the vehicle in a world coordinate system based on a conversion relationship between the camera coordinate system and the vehicle coordinate system and a predetermined conversion relationship between the vehicle coordinate system and the world coordinate system, and the attitude angle of the camera.

For details of the positioning unit 12, reference can be made to the step 903 and description thereof will be omitted here.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method of measuring a distance to a target object, comprising:
    obtaining an attitude angle of a camera corresponding to a current frame of image captured by the camera;
    adjusting an external parameter between a camera coordinate system and a world coordinate system based on the attitude angle of the camera;
    determining respective image coordinates of position points on a lane line on a map in the current frame of image and respective distance information associated with the position points based on a predetermined conversion relationship between an image coordinate system and the world coordinate system and the external parameter between the camera coordinate system and the world coordinate system;
    determining a position point on the lane line on the map in the current frame of image that is closest to the target object; and
    determining a distance to the target object based on the distance information associated with the position point.

2. The method of claim 1, further comprising:
    obtaining, from an inertial measurement unit (IMU), a plurality of IMU attitude angles; and
    obtaining, from the camera, a plurality of images, wherein the camera is coupled to a rigid object on a vehicle, and the IMU is coupled to the rigid object, and wherein each of the plurality of IMU attitude angles has a corresponding output time and each of the plurality of images has a corresponding capture time.

3. The method of claim 2, wherein the camera and the IMU are fixed to the rigid object on the vehicle.

4. The method of claim 2, further comprising:
    determining, based on the plurality of IMU attitude angles, a target IMU attitude angle corresponding to each image of the plurality of images; and
    determining an attitude angle of the camera corresponding to each image of the plurality of images based on a predetermined conversion relationship between a camera coordinate system of the camera and an IMU coordinate system of the IMU and the target IMU attitude angle corresponding to each image.

5. The method of claim 4, further comprising:
    determining, based on the target IMU attitude angle, a position of the vehicle, comprising:
    adjusting an external parameter between the camera coordinate system and a vehicle coordinate system; and
    determining an attitude angle of the vehicle in the world coordinate system based on a predetermined conversion relationship between the camera coordinate system and the vehicle coordinate system, a predetermined conversion relationship between the vehicle coordinate system and the world coordinate system, and the attitude angle of the camera.

6. The method of claim 5, wherein the external parameter between the camera coordinate system and the vehicle coordinate system is a matrix representation of the attitude angle of the camera or a translation value for an X-axis, a Y-axis and a Z-axis between the camera coordinate system and the world coordinate system.

7. The method of claim 2, further comprising:
    selecting, from the plurality of IMU attitude angles, at least one IMU attitude angle whose output time matches the capture time of a current image of the plurality of images, comprising:
    generating a sequence of IMU attitude angles by sorting the plurality of IMU attitude angles in an order based on the corresponding output time of each of the plurality of IMU attitude angles;
    moving a sliding window over the sequence of IMU attitude angles such the sliding window is centered at the capture time of the current image; and
    determining at least one of the sequence of IMU attitude angles within the sliding window as the at least one IMU attitude angle whose output time matches the capture time of the current image; and
    determining, based on the at least one IMU attitude angle, a target IMU attitude angle corresponding to the current image.

8. The method of claim 7, wherein a length of the sliding window is T seconds, wherein the capture time of the current image is $t_1$, and wherein the sliding window spans a time range determined as $[t_1-T/2, t_1+T/2]$.

9. A system for measuring a distance to a target object, comprising:
    a camera;
    an inertial measurement unit (IMU) coupled to the camera; and
    a processor, coupled to the camera and the IMU, configured to:
        obtain an attitude angle of the camera corresponding to a current frame of image captured by the camera;
        adjust an external parameter between a camera coordinate system and a world coordinate system based on the attitude angle of the camera;

determine respective image coordinates of position points on a lane line on a map in the current frame of image and respective distance information associated with the position points based on a predetermined conversion relationship between an image coordinate system and the world coordinate system and the external parameter between the camera coordinate system and the world coordinate system;

determine a position point on the lane line on the map in the current frame of image that is closest to the target object; and determine a distance to the target object based on the distance information associated with the position point.

10. The system of claim 9, wherein the camera is coupled to a rigid object on a vehicle, and the IMU is coupled to the rigid object, wherein the processor is further configured to:
obtain, from the IMU, a plurality of IMU attitude angles;
obtain, from the camera, a plurality of images, wherein each of the plurality of IMU attitude angles has a corresponding output time and each of the plurality of images has a corresponding capture time;
select, from the plurality of IMU attitude angles, at least one IMU attitude angle whose output time matches the capture time of a current image of the plurality of images;
determine a movement curve of the camera or the rigid object;
determine an IMU attitude angle curve by fitting the movement curve based on the at least one IMU attitude angle selected; and
determine, from the IMU attitude angle curve, a target IMU attitude angle corresponding to the current image.

11. The system of claim 10, wherein the movement curve is a straight line.

12. The system of claim 10, wherein the movement curve is a parabola.

13. The system of claim 10, wherein the processor is further configured, as part of determining the target IMU attitude angle corresponding to the current image, to:
calculate an average of the at least one IMU attitude angle selected to determine the target IMU attitude angle.

14. The system of claim 13, wherein the average is an arithmetic average.

15. The system of claim 13, wherein the average is a geometric average.

16. A non-transitory computer-readable storage medium having instructions stored thereupon for measuring a distance to a target object, comprising:
instructions for obtaining an attitude angle of a camera corresponding to a current frame of image captured by the camera;
instructions for adjusting an external parameter between a camera coordinate system and a world coordinate system based on the attitude angle of the camera;
instructions for determining respective image coordinates of position points on a lane line on a map in the current frame of image and respective distance information associated with the position points based on a predetermined conversion relationship between an image coordinate system and the world coordinate system and the external parameter between the camera coordinate system and the world coordinate system;
instructions for determining a position point on the lane line on the map in the current frame of image that is closest to the target object; and
instructions for determining a distance to the target object based on the distance information associated with the position point.

17. The non-transitory computer-readable storage medium of claim 16, further comprising:
instructions for obtaining, from an inertial measurement unit (IMU), a plurality of IMU attitude angles; and
instructions for obtaining, from the camera, a plurality of images, wherein the camera is coupled to a rigid object on a vehicle, and the IMU is coupled to the rigid object.

18. The non-transitory computer-readable storage medium of claim 17, further comprising:
instructions for determining, based on the plurality of IMU attitude angles, a target IMU attitude angle corresponding to each image of the plurality of images; and
instructions for determining an attitude angle of the camera corresponding to each image of the plurality of images based on a predetermined conversion relationship between a camera coordinate system of the camera and an IMU coordinate system of the IMU and the target IMU attitude angle corresponding to each image.

19. The non-transitory computer-readable storage medium of claim 18, further comprising:
instructions for determining, based on the target IMU attitude angle, a position of the vehicle, comprising:
instructions for adjusting an external parameter between the camera coordinate system and a vehicle coordinate system; and
instructions for determining an attitude angle of the vehicle in the world coordinate system based on a predetermined conversion relationship between the camera coordinate system and the vehicle coordinate system, a predetermined conversion relationship between the vehicle coordinate system and the world coordinate system, and the attitude angle of the camera.

20. The non-transitory computer-readable storage medium of claim 16, wherein the respective distance information indicates distances from the position points to the camera.

* * * * *